(12) United States Patent
Kim et al.

(10) Patent No.: US 10,068,539 B2
(45) Date of Patent: Sep. 4, 2018

(54) DISPLAY DEVICE

(71) Applicant: Samsung Display Co., LTD., Yongin, Gyeonggi-Do (KR)

(72) Inventors: Jangil Kim, Asan-si (KR); Unbyoll Ko, Yeoju-si (KR); Seiyong Park, Suwon-si (KR); Jungwook Lee, Anyang-si (KR); Sunghee Hong, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 264 days.

(21) Appl. No.: 14/812,392

(22) Filed: Jul. 29, 2015

(65) Prior Publication Data

US 2016/0118005 A1    Apr. 28, 2016

(30) Foreign Application Priority Data

Oct. 24, 2014 (KR) .................. 10-2014-0145340

(51) Int. Cl.
*G09G 3/36* (2006.01)
*G02F 1/13* (2006.01)

(52) U.S. Cl.
CPC .......... *G09G 3/3648* (2013.01); *G02F 1/13* (2013.01); *G09G 2300/0447* (2013.01); *G09G 2300/0478* (2013.01)

(58) Field of Classification Search
CPC .................................................. G09G 3/3648
See application file for complete search history.

(56) References Cited

U.S. PATENT DOCUMENTS

| | | | | |
|---|---|---|---|---|
| 2006/0268212 A1* | 11/2006 | Someya | ............ | G02F 1/136213 349/144 |
| 2009/0153759 A1* | 6/2009 | Um | ............ | G09G 3/3651 349/39 |
| 2009/0268112 A1* | 10/2009 | Lu | ............ | G02F 1/134309 349/38 |
| 2012/0033001 A1 | 2/2012 | Kim et al. | | |
| 2012/0113371 A1* | 5/2012 | Sohn | ............ | G02F 1/133788 349/124 |

(Continued)

FOREIGN PATENT DOCUMENTS

JP       2011180548 A    9/2011
KR   1020120013552 A    2/2012

(Continued)

*Primary Examiner* — Amr Awad
*Assistant Examiner* — Stephen Bray
(74) *Attorney, Agent, or Firm* — H.C. Park & Associates, PLC

(57) ABSTRACT

A display device includes: a first substrate; a pixel electrode on the first substrate, the pixel electrode including separately formed first and second sub-pixel electrodes; a first thin film transistor (TFT) connected to the first sub-pixel electrode; a second TFT connected to the second sub-pixel electrode; a third TFT connected to one of the first and second TFTs; a gate line connected to the first, second, and third TFTs; a data line intersecting the gate line and respectively connected to the first and second TFTs; and a storage line, at least a part of the storage line spaced apart from and in parallel with the data line and connected to the third TFT. The first, second, and third TFTs may include a common gate electrode extending from the gate line.

17 Claims, 6 Drawing Sheets

(56) References Cited

U.S. PATENT DOCUMENTS

2012/0286274 A1   11/2012  Park et al.
2013/0093658 A1*  4/2013  Park .................... G02F 1/13452
                                                              345/92

FOREIGN PATENT DOCUMENTS

KR     1020120126223 A    11/2012
KR     1020130040504 A     4/2013

* cited by examiner

DISPLAY DEVICE

CLAIM OF PRIORITY

This application claims the priority to and all the benefits accruing under 35 U.S.C. § 119 of Korean Patent Application No. 10-2014-0145340, filed on Oct. 24, 2014, with the Korean Intellectual Property Office (KIPO), the disclosure of which is incorporated herein in its entirety by reference.

BACKGROUND OF THE INVENTION

1. Field of Disclosure

Embodiments of the present invention relate to a display device capable of improving an aperture ratio and transmittance.

2. Description of the Related Art

A liquid crystal display (LCD) device is a type of flat panel displays (FPDs), which is most widely used these days. An LCD device may include two substrates including electrodes formed thereon and a liquid crystal layer interposed therebetween. Upon applying voltage to two electrodes, liquid crystal molecules of the liquid crystal layer are rearranged, thereby adjusting an amount of transmitted light.

Such LCD devices may be categorized into a twisted nematic mode, a vertically aligned mode, a fringe field switch mode and an in-plane switching mode according to an arrangement of liquid crystal molecules or electrodes when an electric field is not formed.

In the case of the vertically aligned mode of the LCD, a method has been studied where one pixel is divided into two sub-pixels and voltages of different levels are respectively applied to the two sub-pixels in order to achieve side visibility similar to front visibility.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY

Aspects of embodiments of the present invention are directed to a display device reduced in size of a non-aperture area on which a thin film transistor is disposed, thereby improving an aperture ratio and transmittance.

According to an exemplary embodiment of the present invention, a display device includes: a first substrate; a pixel electrode on the first substrate, the pixel electrode including separately formed first and second sub-pixel electrodes; a first thin film transistor (TFT) connected to the first sub-pixel electrode; a second TFT connected to the second sub-pixel electrode; a third TFT connected to one of the first and second TFTs; a gate line connected to the first, second, and third TFTs; a data line intersecting the gate line and respectively connected to the first and second TFTs; and a storage line, at least a part of the storage line spaced apart from and in parallel with the data line and connected to the third TFT. The first, second, and third TFTs may include a common gate electrode extending from the gate line.

The first and second TFTs may include a common source electrode extending from the data line.

The first TFT may include a first drain electrode connected to the first sub-pixel electrode, the second TFT may include a second drain electrode connected to the second sub-pixel electrode, and the third TFT may be disposed adjacent to one of the first and second drain electrodes and connected to the storage line.

The common source electrode may be disposed between the first and second drain electrodes.

The common source electrode and the first, second, and third drain electrodes may overlap the common gate electrode.

The common source electrode and the first, second, and third drain electrodes may be disposed parallel to each other.

A fraction of voltage applied to the first drain electrode or the second drain electrode may be applied to the third drain electrode.

Voltage applied to the storage line may be adjusted to thereby adjust voltage applied from the first drain electrode or the second drain electrode to the third drain electrode.

The storage line may include first and second lines spaced apart from and in parallel with the data line and a connection line configured to connect the first and second lines.

The first line may intersect the first sub-pixel electrode and the second line may intersect the second sub-pixel electrode.

The connection line may be disposed between the first and second sub-pixel electrodes.

The connection line may overlap the first sub-pixel electrode or the second sub-pixel electrode.

The first and second sub-pixel electrodes may include a transverse stem electrode, a longitudinal stem electrode, and a plurality of branch electrodes extending from the transverse stem electrode and the longitudinal stem electrode.

The branch electrode may include a first branch electrode extending in an upper left direction from the transverse stem electrode and the longitudinal stem electrode, a second branch electrode extending in an upper right direction from the transverse stem electrode and the longitudinal stem electrode, a third branch electrode extending in a lower left direction from the transverse stem electrode and the longitudinal stem electrode, and a fourth branch electrode extending in a lower right direction from the transverse stem electrode and the longitudinal stem electrode.

The display device may further include a second substrate opposed to the first substrate; a common electrode on the second substrate; and a liquid crystal layer interposed between the first and second substrates.

The display device may further include an alignment layer on the first substrate or the second substrate. The alignment layer or the liquid crystal layer may include a photopolymer material.

According to embodiments of the present invention, a display device may be reduced in size of a non-aperture area on which a thin film transistor is disposed, thereby improving an aperture ratio and transmittance.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION

Figure 1:
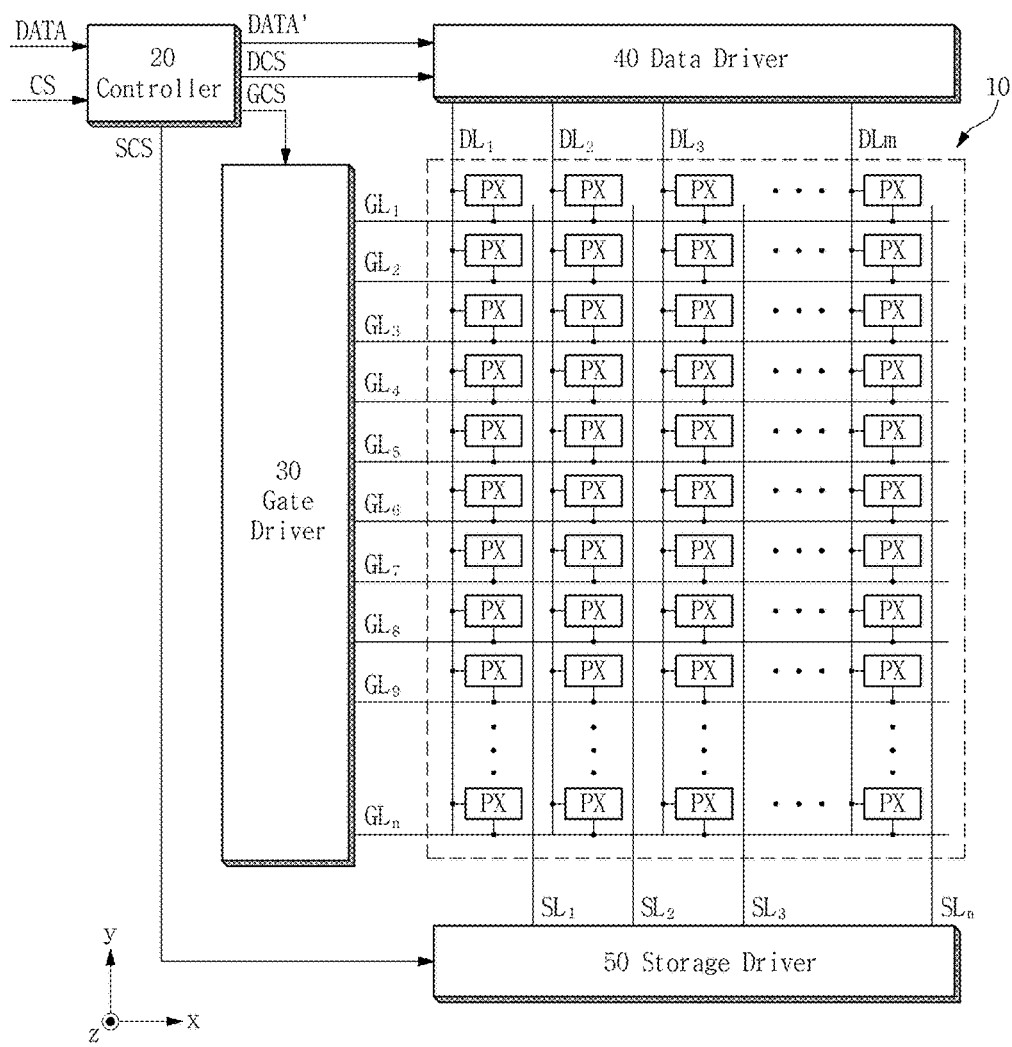
FIG. 1 is a block diagram illustrating a display device according to an exemplary embodiment.

Advantages and features of the present invention and methods for achieving them will be made clear from embodiments described below in detail with reference to the accompanying drawings. The present invention may, however, be embodied in many different forms and should not be construed as being limited to the embodiments set forth herein. Rather, these embodiments are provided so that this disclosure will be thorough and complete, and will fully convey the scope of the invention to those skilled in the art. The present invention is merely defined by the scope of the claims. Therefore, well-known constituent elements, operations and techniques are not described in detail in the embodiments in order to prevent the present invention from being obscurely interpreted. Like reference numerals refer to like elements throughout the specification.

The spatially relative terms "below", "beneath", "lower", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

FIG. 1 is a block diagram illustrating a display device according to an exemplary embodiment.

Referring to FIG. 1, the display device according to an exemplary embodiment may include a display panel 10 including a plurality of pixels PXs, a controller 20 configured to process externally supplied image signal DATA and control signal CS to thereby output a variety of signals, a gate driver 30 configured to supply a gate signal to gate lines GL1~GLn, a data driver 40 configured to supply a data voltage to data lines DL1~DLm, and a storage driver 50 configured to apply a storage voltage to storage lines SL1~SLn.

The display panel 10 may include the plurality of gate lines GL1~GLn configured to supply the gate signal in a row direction, the plurality of data lines DL1~DLm configured to supply the data voltage in a column direction, the plurality of storage lines SL1~SLn configured to supply the storage voltage in a column direction, and the plurality of pixels PXs arranged in a matrix form connected to the gate and data lines.

The display panel 10 may include a first substrate, a second substrate separate from and opposed to the first substrate, and a liquid crystal layer interposed between the first and second substrates.

The controller 20 is configured to output a corrected image signal DATA' to the data driver 40 based on the externally supplied image signal DATA. Further, the controller 20 may apply, based on the externally applied control signal CS, a gate control signal GCS to the gate driver 30, a data control signal DCS to the data driver 40, and a storage control signal SCS to the storage driver 50. For example, the control signal CS may be timing signals such as a vertical synchronization signal Vsync, a horizontal synchronization signal Hsync, a clock signal CLK, and a data enable signal DE. Further, the image signal DATA may be a digital signal expressing a gray level of light emitted from the pixel PX.

The gate driver 30 is configured to receive the gate control signal GCS from the controller 20 to thereby generate a gate signal and supply the gate signal to the pixels PXs respectively connected to the plurality of gate lines GL1~GLn. As the gate signals are sequentially inputted to the pixels PXs, the data voltages may be sequentially applied to the pixels PXs.

The data driver 40 is configured to receive the data control signal DCS and the corrected image signal DATA' from the controller 20 and to apply, in response to the data control signal DCS, a data voltage corresponding to the corrected image signal DATA' to the pixels PXs respectively connected to the plurality of data lines DL1~DLm.

The storage driver 50 is configured to receive the storage control signal SCS from the controller 20 to thereby generate a storage voltage and to apply the storage voltage to the plurality of storage lines SL1~SLn.

Figure 2:
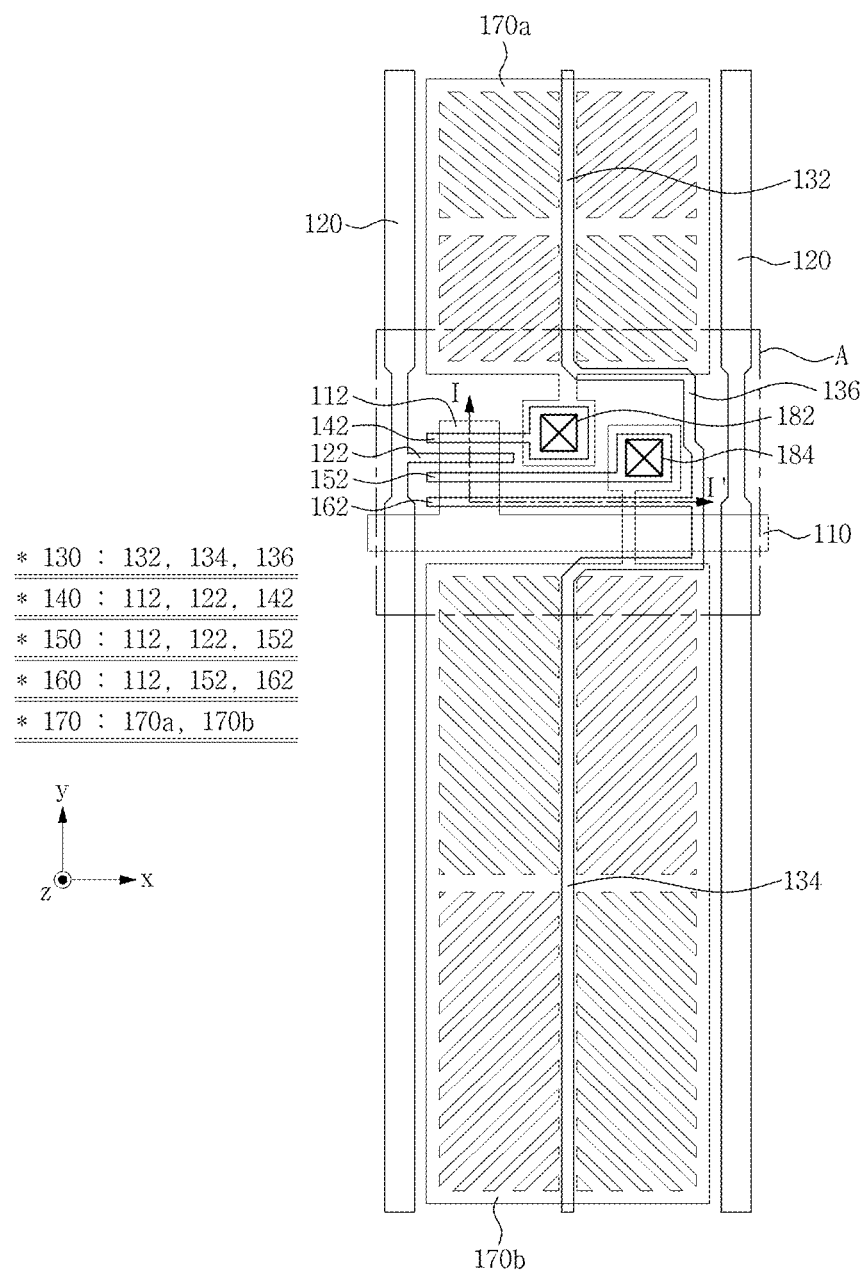
FIG. 2 is a plan view illustrating a pixel of a display device according to an exemplary embodiment.
Figure 3:
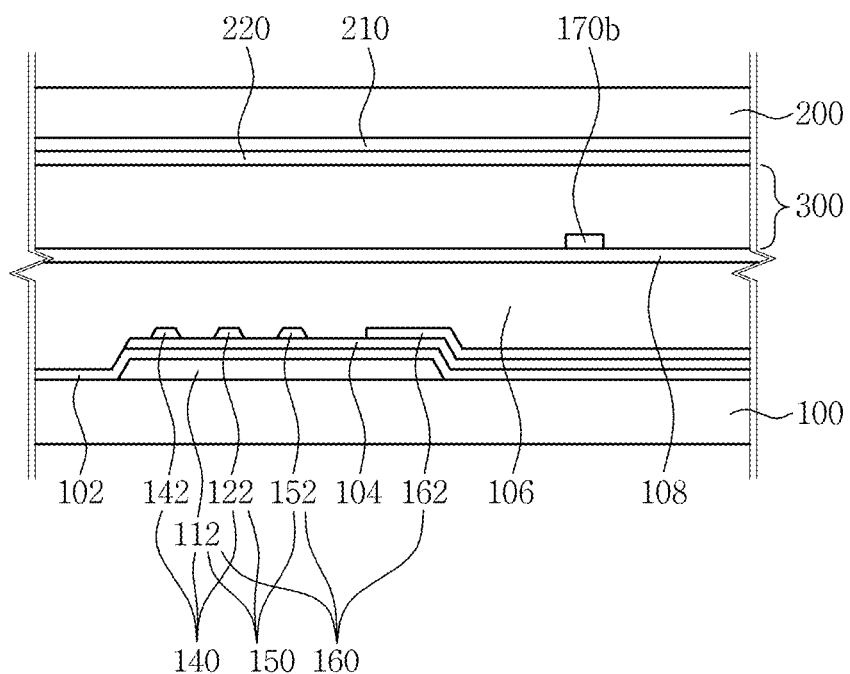
FIG. 3 is a cross-sectional view taken along line I-I' of FIG. 2.

FIG. 2 is a plan view illustrating a pixel of a display device according to an exemplary embodiment. FIG. 3 is a cross-sectional view taken along line I-I' of FIG. 2.

The first substrate 100 may include transparent glass or plastic and may be provided in a flat-panel type or a curved type having a predetermined radius of curvature.

The gate line 110 may be horizontally disposed on the first substrate 100. The gate line 110 may include at least one of metals of aluminum (Al) or alloys thereof, silver (Ag) or alloys thereof, copper (Cu) or alloys thereof, molybdenum (Mo) or alloys thereof, chromium (Cr), tantalum (Ta) and titanium (Ti), but is not limited thereto. In some embodiments, the gate line 110 may have a multi-layer structure including at least two conductive layers that have different physical properties.

The data line 120 may be longitudinally disposed to intersect the gate line 110 and insulated from the gate line 110 by a gate insulating layer 102. The data line 120 may include refractory metal, such as molybdenum, chromium, tantalum and titanium or metal alloys thereof, but is not limited thereto. In some embodiments, the data line 120 may have a multi-layer structure including a refractory metal layer and a low-resistance conductive layer.

The storage line 130 may be applied with a predetermined voltage, such as a storage voltage Vcst, and may include at least one of metals of aluminum (Al) or alloys thereof, silver (Ag) or alloys thereof, copper (Cu) or alloys thereof, molybdenum (Mo) or alloys thereof, chromium (Cr), tantalum (Ta) and titanium (Ti), but is not limited thereto. In some embodiments, the gate line 110 may have a multi-layer structure including at least two conductive layers that have different physical properties.

The storage line 130 may include first and second lines 132 and 134 spaced apart from and in parallel with the data line 120 and a connection line 136 configured to connect the first and second lines 132 and 134 and provided in a bent form. The first and second lines 132 and 134 and the connection line 136 may be integrally formed into a single unit, but is not limited thereto. In some embodiments, the storage line 130 may be spaced apart from and in parallel with the gate line 110 between first and second sub-pixel electrodes 170a and 170b.

The first line 132 may intersect the first sub-pixel electrode 170a and the second line 134 may intersect the second sub-pixel electrode 170b. It is desirable that the first line 132 overlaps a longitudinal stem electrode of the first sub-pixel electrode 170a described below and the second line 134 overlaps a longitudinal stem electrode of the second sub-pixel electrode 170b described below.

The connection line 136 may be disposed between the first and second sub-pixel electrodes 170a and 170b and may be disposed outside of first and second connection holes 182 and 184. The connection line 136 may overlap the first sub-pixel electrodes 170a or the second sub-pixel electrodes 170b.

A first TFT 140 may be connected to the first sub-pixel electrode 170a, a second TFT 150 may be connected to the second sub-pixel electrode 170b, and a third TFT 160 may be respectively connected to the storage line 130 and the second TFT 150.

The first, second, and third TFTs 140, 150, and 160 may include a common gate electrode 112 extending from the gate line 110 and the first and second TFTs 140 and 150 may further include a common source electrode 122 extending from the date line 120.

Further, the first TFT 140 may include a first drain electrode 142 connected to the first sub-pixel electrode 170a, the second TFT 150 may further include a second drain electrode 152 connected to the second sub-pixel electrode 170b, and the third TFT 160 may include a third drain electrode 162 disposed adjacent to the second drain electrode 152 and connected to the storage line 130.

The common gate electrode 112 may be insulated from the common source electrode 122 and the first, second, and third drain electrodes 142, 152, and 162 by the gate insulating layer 102. A semiconductor layer 104 may be disposed on the gate insulating layer 102.

The first, second, and third TFTs 140, 150, and 160 are described below in detail with reference to FIG. 4.

A color filter 106 may be disposed on the common source electrode 122 and on the first, second and third drain electrodes 142, 152, and 162. The color filter 106 may display one of base colors, such as three primary colors of red, green, and blue, but is not limited thereto. In some embodiments, the color filter 106 may display one of cyan, magenta, yellow, and white colors. However, embodiments of the present invention are not limited thereto, and thus the color filter 106 may be disposed on the second substrate 200.

A capping layer 108 may be disposed on the color filter 106. The capping layer 108 may include inorganic or organic materials such as silicon nitrides (SiNx), silicon oxides (SiOx), or carbon-implanted silicon oxide (SiOC). Further, the capping layer 108 is configured to prevent infiltration of undesired materials produced from the color filter 106 into the liquid crystal layer 300.

The pixel electrode 170 may be disposed on the capping layer 108 and may include transparent conductive materials. The pixel electrode 170 may include the first and second sub-pixel electrodes 170a and 170b disposed next to each other in a column direction with respect to the gate line 110 and separated from each other.

The first sub-pixel electrode 170a may be electrically connected to the first drain electrode 142 through the first coupling hole 182 and applied with the data voltage and the second sub-pixel electrode 170b may be electrically connected to the second drain electrode 152 through the second coupling hole 184.

The first and second sub-pixel electrodes 170a and 170b are described below in more detail with reference to FIG. 5.

Although not illustrated, an alignment layer may be further disposed on the pixel electrode 170. The alignment layer may be a vertical alignment layer or an alignment layer optically aligned using a photopolymer material. The photopolymer material may be a reactive monomer or a reactive mesogen.

The second substrate 200 may be disposed opposed to the first substrate 100 and may include transparent glass or plastic. The second substrate 200 may be provided in a flat-panel type or a curved type having a predetermined radius of curvature, corresponding to the first substrate 100.

A planarizing layer 210 and a common electrode 220 may be sequentially disposed on the second substrate 200. The planarizing layer 210 may include organic materials and the common electrode 220 may include transparent conductive materials.

Although not illustrated, a black matrix may be disposed on the planarizing layer 210 along the gate line 110 and the data line 120. The black matrix may prevent light leakage occurring at the gate line 110 and the data line 120. However, embodiments of the present invention are not limited thereto, and thus the black matrix may be disposed on the first substrate 100.

Although not illustrated, an alignment layer may be further disposed on the common electrode 220. The alignment layer may be a vertical alignment layer or an alignment layer optically aligned using a photopolymer material. The photopolymer material may be a reactive monomer or a reactive mesogen.

The liquid crystal layer 300 may be interposed between the first and second substrates 100 and 200. The liquid crystal layer 300 may include a photopolymer material. The photopolymer material may be a reactive monomer or a reactive mesogen.

Figure 4:
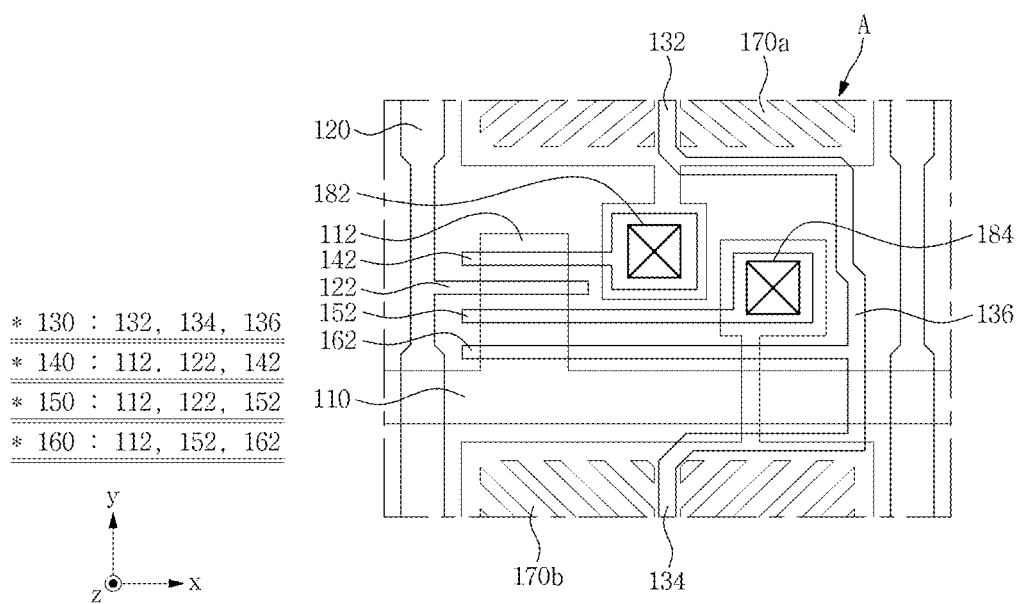
FIG. 4 is an enlarged plan view illustrating portion A of FIG. 2.

FIG. 4 is an enlarged plan view illustrating portion A of FIG. 2. The first, second, and third TFTs 140, 150, and 160 are described below in detail with reference to FIG. 4.

The first TFT 140 may include the common gate electrode 112, the common source electrode 122, and the first drain electrode 142.

The second TFT 150 may include the common gate electrode 112, the common source electrode 122, and the second drain electrode 152.

The third TFT 160 may include the common gate electrode, the second drain electrode 152, and the third drain electrode 162.

The second drain electrode 152, in the case of the second TFT 150, is configured to receive a data voltage from the common source electrode 122 and to apply the data voltage to the second sub-pixel electrode 170b. The third TFT 160 is, however, configured to apply a data voltage to the third drain electrode 162.

The common source electrode 122 may be disposed between the first and second drain electrodes 142 and 152. At least a part of the common source electrode 122 and the first, second, and third drain electrodes 142, 152, and 162 may overlap the common gate electrode 112. Further, the common source electrode 122 and the first, second, and third drain electrodes 142, 152, and 162 may be disposed parallel to each other. It is desirable that the common source electrode 122 and the first, second, and third drain electrodes 142, 152, and 162 may have a bar-shape and may be disposed parallel to each other.

When a gate signal is applied to the gate line 110, the data voltage applied to the data line 120 may be transmitted from the common source electrode 122 to the first drain electrode 141 and the second drain electrode 152, respectively.

The data voltage applied to the first drain electrode 142 may be applied to the first sub-pixel electrode 170a through the first connection hole 182 and the data voltage applied to the second drain electrode 152 may be applied to the second sub-pixel electrode 170b through the second connection hole 184.

The total data voltage applied to the first drain electrode 142 may be transmitted to the first sub-pixel electrode 170b, whereas a fraction of the data voltage applied to the second drain electrode 152 may be applied to the third drain electrode 162 and the other fraction of the data voltage may be applied to the second sub-pixel electrode 170b. Accordingly, the first sub-pixel electrode 170a may be applied with a voltage higher than that of the second sub-pixel electrode 170b.

In this case, the third drain electrode 162 may be connected to the storage line 130, and thus the voltage Vcst applied to the storage line 130 may be adjusted to thereby adjust voltage applied from the second drain electrode 152 to the third drain electrode 162.

In the display device according to an exemplary embodiment, the common source electrode 122, and the first, second, and third drain electrodes 142, 152, and 162 may be disposed to overlap the common gate electrode 112, thereby capable of reducing the size of the first, second, and third TFTs 140, 150, and 160. Accordingly, a non-aperture area between the first and second sub-pixel electrodes 170a and 170b may be reduced, thereby improving an aperture ratio and transmittance.

Figure 5:
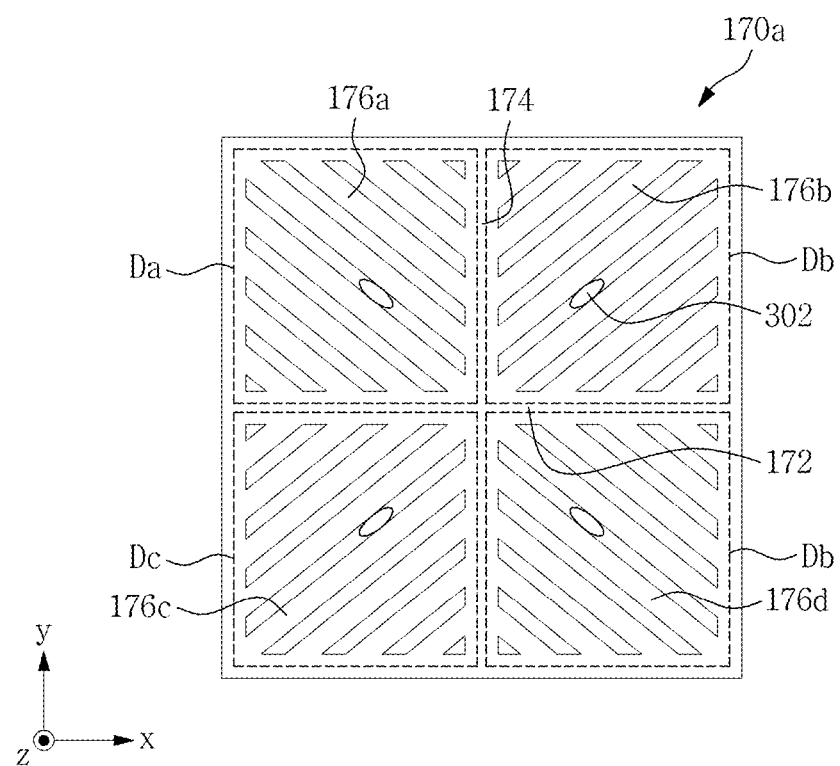
FIG. 5 is a view illustrating a fundamental structure of a first sub-pixel electrode of FIG. 2.

FIG. 5 is a view illustrating a fundamental structure of the first sub-pixel electrode of FIG. 2. Hereinafter, the first sub-pixel electrode 170a is described in detail with reference to FIG. 5.

Referring to FIG. 5, the first sub-pixel electrode 170a may include a transverse stem electrode 172, a longitudinal stem electrode 174, and a plurality of branch electrodes 176a, 176b, 176c, and 176d extending from the transverse stem electrode 172 and the longitudinal stem electrode 174.

The transverse stem electrode 172 and the longitudinal stem electrode 174 may respectively have a linear shape and combined into a cross shape to form a stem electrode, but are not limited thereto. In some embodiments, the transverse stem electrode 172 and the longitudinal stem electrode 174 may be differently formed to have a greater gap from one side of the first sub-pixel electrode 170b to a center portion thereof.

The first branch electrode 176a may extend in an upper left direction from the transverse stem electrode 172 and the longitudinal stem electrode 174, the second branch electrode 176b may extend in an upper right direction from the transverse stem electrode 172 and the longitudinal stem electrode 174, the third branch electrode 176c may extend in a lower left direction from the transverse stem electrode 172 and the longitudinal stem electrode 174, and the fourth branch electrode 176d may extend in a lower right direction from the transverse stem electrode 172 and the longitudinal stem electrode 174.

Sides of the first, second, third, and fourth branch electrodes 176a 176b, 176c, and 176d may cause electric field distortion and produce a horizontal component of the electric field, which determines an inclination direction of liquid crystal molecules 302. The horizontal component of the electric field may be substantially horizontal with respect to the sides of the first, second, third, and fourth branch electrodes 176a, 176b, 176c, and 176d. Accordingly, the liquid crystal molecules 302 may be aligned in four different directions in four sub areas Da, Db, Dc, and Dd of the first sub-pixel electrode 170a.

The second sub-pixel electrode 170b may be formed in the same manner as the first sub-pixel electrode 170a, and thus the detailed description of the second sub-pixel electrode 170b may be omitted. However, the second sub-pixel electrode 170b may be different from the first sub-pixel electrode 170a in size. A scope of the present invention is not limited to the size of the first and second sub-pixel electrodes 170a and 170b.

Figure 6:
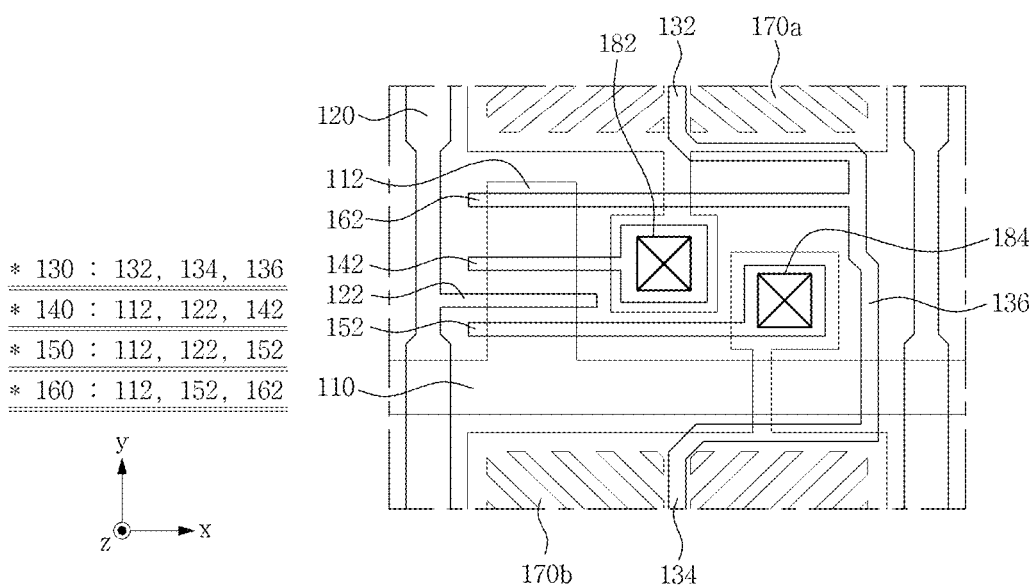
FIG. 6 is a plan view illustrating a pixel of a display device according to another exemplary embodiment.

FIG. 6 is a plan view illustrating a pixel of a display device according to another exemplary embodiment.

Referring to FIG. 6, the display device according to another exemplary embodiment is identical to the display device illustrated in FIG. 2, except for a third TFT 160. Accordingly, the repeated description will be omitted for conciseness.

The third TFT 160 may include a common gate electrode, a first drain electrode 142, and a third drain electrode 162 disposed adjacent to the first drain electrode 142 and connected to a storage line 130.

A first drain electrode 142, in the case of a first TFT 140, may receive a data voltage from a common source electrode 122 to thereby apply the data voltage to a first sub-pixel electrode 170a. The third TFT 160 may, however, apply a data voltage to the third drain electrode 162.

When a gate signal is applied to a gate line 110, the data voltage applied to a data line 120 may be applied from a common source electrode 122 to the first drain electrode 142 and a second drain electrode 152.

The data voltage applied to the first drain electrode 142 may be applied to the first sub-pixel electrode 170a through a first connection hole 182 and the data voltage applied to the second drain electrode 152 may be applied to a second sub-pixel electrode 170b through a second connection hole 184.

A fraction of data voltage applied to the first drain electrode 142 may be transmitted to the third drain electrode 162 and the other fraction of the data voltage may be applied to the first sub-pixel electrode 170a, whereas the total data voltage applied to the second drain electrode 152 may be transmitted to the second sub-pixel electrode 170b. Accordingly, the first sub-pixel electrode 170a may be applied with a data voltage lower than that of the second sub-pixel electrode 170b.

In this case, since the third drain electrode 162 is connected to the storage line 130, a voltage Vcst applied to the storage line 130 may be adjusted to thereby adjust voltage applied from the first drain electrode 142 to the third drain electrode 162.

From the foregoing, it will be appreciated that various embodiments in accordance with the present disclosure have been described herein for purposes of illustration, and that various modifications may be made without departing from the scope and spirit of the present teachings. Accordingly, the various embodiments disclosed herein are not intended to be limiting of the true scope and spirit of the present teachings. Various features of the above described and other embodiments can be mixed and matched in any manner, to produce further embodiments consistent with the invention.

What is claimed is:

1. A display device comprising:
   a first substrate;
   a pixel electrode on the first substrate, the pixel electrode comprising separately formed first and second sub-pixel electrodes;
   a first thin film transistor (TFT) connected to the first sub-pixel electrode;
   a second TFT connected to the second sub-pixel electrode;
   a third TFT connected to one of the first and second TFTs;
   a gate line connected to the first, second, and third TFTs;
   a data line intersecting the gate line and respectively connected to the first and second TFTs; and
   a storage line, at least a part of the storage line spaced apart from and in parallel with the data line and connected to the third TFT,
   wherein the first, second, and third TFTs comprise a common gate electrode extending from the gate line, the first TFT comprises a first drain electrode, the second TFT comprises a second drain electrode, the third TFT comprises a third drain electrode, and the first, second, and third drain electrodes are parallel to each other and overlap an entire width of the common gate electrode in a direction that is parallel to the gate line.

2. The display device of claim 1, wherein the first and second TFTs comprise a common source electrode extending from the data line.

3. The display device of claim 2, wherein the first drain electrode is connected to the first sub-pixel electrode, the second drain electrode is connected to the second sub-pixel electrode, and the third drain electrode is disposed adjacent to one of the first and second drain electrodes and connected to the storage line.

4. The display device of claim 3, wherein the common source electrode is disposed between the first and second drain electrodes.

5. The display device of claim 3, wherein the common source electrode and the first, second, and third drain electrodes overlap the common gate electrode.

6. The display device of claim 3, wherein the common source electrode and the first, second, and third drain electrodes are disposed parallel to each other.

7. The display device of claim 2, wherein a fraction of voltage applied to the first drain electrode or the second drain electrode is applied to the third drain electrode.

8. The display device of claim 7, wherein voltage applied to the storage line is adjusted to thereby adjust voltage applied from the first drain electrode or the second drain electrode to the third drain electrode.

9. The display device of claim 1, wherein the storage line comprises first and second lines spaced apart from and in parallel with the data line and a connection line configured to connect the first and second lines.

10. The display device of claim 9, wherein the first line intersects the first sub-pixel electrode and the second line intersects the second sub-pixel electrode.

11. The display device of claim 9, wherein the connection line is disposed between the first and second sub-pixel electrodes.

12. The display device of claim 11, wherein the connection line overlaps the first sub-pixel electrode or the second sub-pixel electrode.

13. The display device of claim 1, wherein the first and second sub-pixel electrodes comprise a transverse stem electrode, a longitudinal stem electrode, and a plurality of branch electrodes extending from the transverse stem electrode and the longitudinal stem electrode.

14. The display device of claim 13, wherein the branch electrode comprises a first branch electrode extending in an upper left direction from the transverse stem electrode and the longitudinal stem electrode, a second branch electrode extending in an upper right direction from the transverse stem electrode and the longitudinal stem electrode, a third branch electrode extending in a lower left direction from the transverse stem electrode and the longitudinal stem electrode, and a fourth branch electrode extending in a lower right direction from the transverse stem electrode and the longitudinal stem electrode.

15. The display device of claim 1, further comprising:
   a second substrate opposed to the first substrate;
   a common electrode on the second substrate; and
   a liquid crystal layer interposed between the first and second substrates.

16. The display device of claim 15, further comprising: an alignment layer on the first substrate or the second substrate, wherein the alignment layer or the liquid crystal layer comprises a photopolymer material.

17. The display device of claim 1, wherein the first, second, and third drain electrodes are parallel to the gate line.

* * * * *